May 1, 1951

R. B. DOME 2,551,250

PULSE DISCRIMINATOR

Filed Nov. 12, 1947

Inventor:
Robert B. Dome,
by Merton D. Moore
His Attorney.

Patented May 1, 1951

2,551,250

UNITED STATES PATENT OFFICE 2,551,250

PULSE DISCRIMINATOR

Robert B. Dome, Geddes Township, Onondaga County, N. Y., assignor to General Electric Company, a corporation of New York Application November 12, 1947, Serial No. 785,227

3 Claims. (Cl. 250—27)

Figure 1:
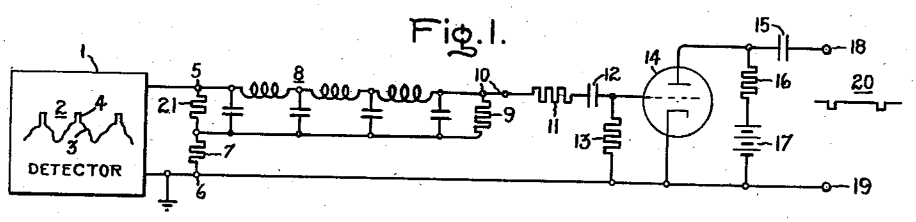

My invention relates to pulse discriminator circuits, and more particularly to circuits employed in television receivers for separating the synchronizing impulses from the composite television signals.

In television systems, it is usual to transmit both the horizontal and vertical synchronizing impulses at an amplitude greater than the picture, or video signals, and concomitantly therewith. It is, therefore, necessary at the receiver, to separate the synchronizing impulses from the video signals, and further to separate the vertical synchronizing impulses from the horizontal synchronizing impulses. This is usually accomplished by passing the composite signal through a separator tube, adjusted so that the synchronizing impulses, which are of a higher amplitude, are clipped from the composite signal. The vertical and horizontal impulses are then separated from each other, and each of these impulses is transmitted to its corresponding sawtooth generators to produce the necessary deflection currents associated with the receiver image tube. These synchronizing impulses are usually in the "black" direction, and are of greater amplitude in that direction than the blackest of the video signals.

A number of systems have been proposed for clipping the synchronizing impulses from the composite signals, by applying the composite signals to a discharge device having a cathode, an anode and a control grid, whereby the negative bias impressed on the control grid is of sufficient magnitude to allow the discharge device to pass only the synchronizing impulses. These systems operate very satisfactorily in the absence of noise impulses. However, passing motor cars, for example, through their ignition systems, inject noise impulses into the receiver antenna, and these appear as narrow impulses on the composite signal. These impulses effectively suppress the receiver clipper tube for several cycles, and as a result, the scanning circuits following the clipper tube lose synchronization for the duration of the suppression, resulting in a distortion in the image on the receiver image tube.

It is, therefore, an object of my invention to provide a pulse discriminator circuit wherein the above-mentioned noise impulses are effectively suppressed.

It is a further object of my invention to provide a pulse discriminator circuit for use in television receivers, and other receivers of the various pulse systems, wherein all pulses of less than a predetermined duration are suppressed, as compared to pulses of greater than a predetermined duration.

Another object of my invention is to provide a separating circuit, adapted to separate the synchronizing impulses from the composite television signal, and wherein noise impulses, of a shorter duration than the synchronizing impulses, are effectively suppressed.

Another object of my invention is to provide a system for separating the long duration vertical synchronizing impulses from the shorter duration horizontal synchronizing impulses.

Figure 2A:
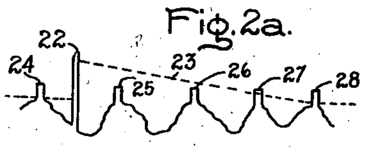
Figure 2B:
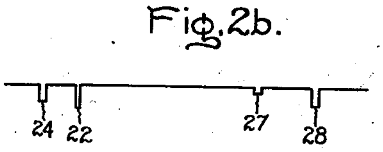
Figure 3:
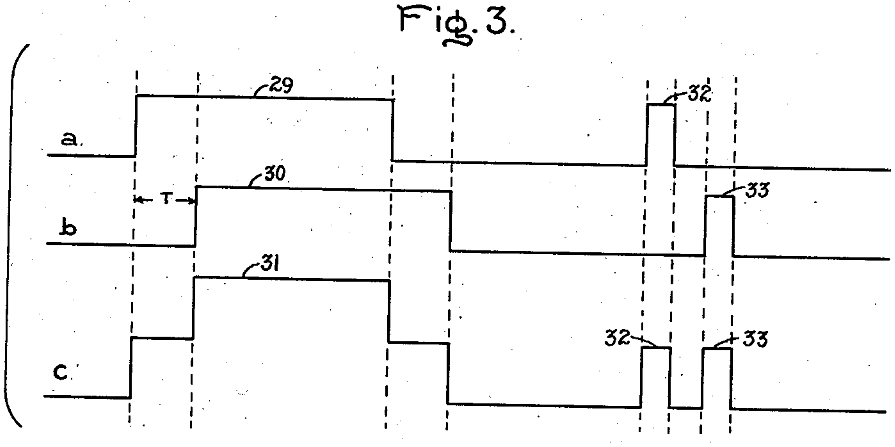
Figure 4:
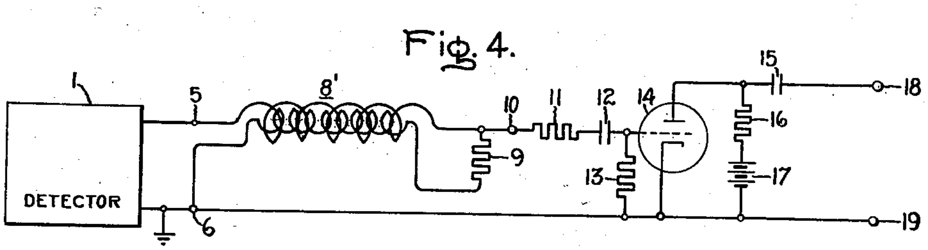
Figure 5:
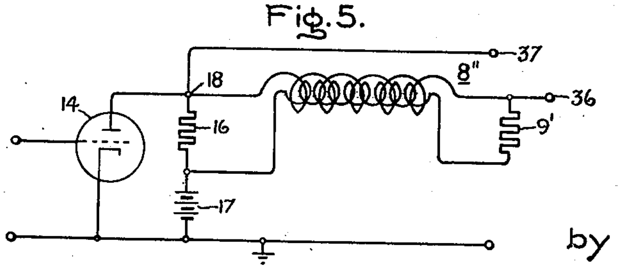

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawing, in which Fig. 1 shows a pulse separating circuit in a television receiver embodying my invention. Figs. 2*a* and 2*b* are graphical illustrations showing the operation of a conventional pulse separator circuit in a television receiver; Fig. 3 is a graphical illustration showing the operation of the circuit illustrated in Fig. 1; Fig. 4 is a circuit diagram, showing a modified form of my invention; Fig. 5 is a circuit diagram, showing a modification of my invention as applied to the separation of horizontal and vertical synchronizing impulses in a television receiver.

Referring to Fig. 1, the block 1 represents the detector stage of a conventional television receiver. Received signals, upon detection, have a waveform 2 and comprise video signals 3 and synchronizing impulses 4, of greater amplitude than the video signals.

The various other stages of the television receiver, well known in the art, and having no bearing on the present invention, are not shown in this figure. The signals from detector 1 are applied to a pulse separator circuit at the terminals 5 and 6, so that the synchronizing impulses may be separated from the composite signal.

The pulse separator circuit comprises an electron discharge device 14, having an anode, a cathode and a control electrode. The terminal 5 is connected to the control electrode of device 14 through a delay circuit 8, and a resistor 11 and capacitor 12 connected in series. The terminal 6 is grounded. A grid-leak resistor 13 is connected between the control electrode of device 14 and ground. The cathode of the device 14 is grounded, and the anode is connected to the positive terminal of a unidirectional potential source 17, through a resistor 16. The negative terminal of the source 17 is grounded. Output signals may be taken between the terminal 18, and the grounded terminal 19. The terminal 18 is connected to the anode of device 14, through a blocking capacitor 15. Resistors 21 and 7 are disposed in series across the input terminals 5 and 6. Resistor 21 serves as the input resistor to the delay circuit 8, and a resistor 9 serves as the terminating resistor for the delay circuit. The delay circuit 8 is of the conventional inductance-capacitance, ladder type. The delay time in this circuit should be made shorter than the shortest pulse desired to be transmitted by the device 14, but the time delay should be as long as can be made to obtain the maximum noise reduction. The best actual time delay to be used may be determined empirically through quantitative and subjective tests.

It is apparent that the impulse separator circuit shown in Fig. 1 differs from the conventional separator circuit only that it includes the delay line 8. The operation of this circuit will be described with references to Figs. 2*a* and 2*b* and Fig. 3, taken in conjunction with Fig. 1.

If the delay circuit 8 is removed from the circuit of Fig. 1, this circuit operates as a conventional separator circuit in a well known manner. Grid rectification biases the device 14 well beyond cutoff so that the video part of the composite signal 2 is in the cutoff region. As a result, the anode current is zero during this interval, thereby eliminating the video signal and resulting in an output wave 20 shown in Fig. 1 in which the video signal has been removed, leaving the synchronizing impulses reversed in phase.

This circuit would operate well providing no impulse noise was present along with the signal. If such a noise impulse were injected in the signal, as shown at 22, in Fig. 2*a*, in the absence of the resistor 11 in Fig. 1, this impulse would force the bias of the control electrode of the device 14 higher than that determined by the synchronizing impulse 24, in Fig. 2*a*, as shown by the dotted line 23, so that the next succeeding synchronizing impulse 25 would be in the cutoff portion of the device 14 and would not appear in the output wave shown in Fig. 2*b*. Likewise, other impulses may be suppressed as, for example, the impulse 26 entirely and the impulse 27 partially. The resistor 11 in Fig. 1, is customarily added to limit the charging current on the noise impulse peaks, and as a result, the change in the cutoff point, due to noise impulses, is reduced. However, this does not entirely remedy the situation, as resistor 11 cannot be made high enough to suppress completely the charging current, without giving rise to other undesired effects.

In my separator circuit, as shown in Fig. 1, the delay line 8, is interposed between terminal 5 and resistor 11. The input voltage to the delay line is adjusted so that the output voltage across the terminating resistor 9, is substantially equal in magnitude to the original pulse voltage appearing across resistor 7 but delayed in time. Thus, between the terminal 10 and ground, there appears the sum of two waves, one with original timing, and one with delayed timing. The time delay in the delay circuit 8, is made shorter than the shortest pulse desired to be transmitted by the device 14, but as long as possible to obtain maximum noise reduction.

The effect of this delay line is shown in Fig. 3, in which the wave *a* shows a small portion of the wave 2 in Fig. 1. In particular, pulse 29 represents a desired pulse, and pulse 32 represents an undesired noise pulse of shorter duration. The wave *b* shows the time delayed wave appearing across the resistor 9 in Fig. 1. The time delay of the pulse 30 of the wave *b* is T, similarly the noise pulse is delayed a like interval and is shown as pulse 33. The wave *c* is the sum of the waves *a* and *b*, and appears between the terminal 10 and ground in Fig. 1. It is apparent that the desired pulses overlap and add to twice their normal amplitude, as shown at 31, while the undesired pulses do not overlap and appear at their original amplitude.

The device 14 may be adjusted to respond to the peak portion of the wave 31 only, and to be unresponsive to the lower portion of this wave, and to the noise impulses 32 and 33.

It will be apparent from Fig. 3, that a noise impulse 32 may have an original amplitude twice that of the pulse 29, and still not exceed the amplitude of the combined pulse 31 in the wave *c*.

Fig. 4 shows an embodiment of my pulse discriminator circuit, wherein a delay line comprising a double solenoid winding is substituted for the type of delay line shown in Fig. 1. In other respects, this circuit is similar to the circuit shown in Fig. 1, and corresponding parts have been designated by the same numerals. The delay line shown at 8′ in Fig. 4 consists of the double solenoid winding wound on an insulated tube. One solenoid is wound clockwise, and the second is wound counterclockwise directly over the first. The windings are insulated from each other in such a way so as to adjust the capacitance of the delay line 8′. No dividing resistors, such as the resistors 21 and 7 in Fig. 1, are required in this embodiment. This particular delay line has the property, when connected as shown in Fig. 4, of providing the composite wave *c* of Fig. 3 between the terminal 10 and ground, that is, both the delayed wave and the original wave appear between the terminal 10 and ground.

It is obvious that many other types of delay lines, apart from those herein specified, may be employed in my pulse separator circuit.

Fig. 5 shows another embodiment of my pulse separator circuit, wherein the circuit is used to provide a separation between the serrated vertical synchronizing impulses, and the horizontal synchronizing impulses. In this circuit, parts corresponding to like parts in Fig. 1, have been designated by the same numerals. An additional delay line 8″ is included in the output circuit of the discharge device 14. The horizontal synchronizing impulses are taken from between the terminal 37 and ground, and are supplied directly to the horizontal deflection oscillator (not shown). The delay time of the line 8″ is selected to be greater than the duration of the horizontal impulses, and less than the duration of the vertical impulses. Hence, the original and delayed vertical impulses will overlap and thus raise the amplitude of the vertical impulse to twice its normal value and the shorter duration horizontal pulses will retain their original amplitude. The output taken from between the terminal 36 and ground is supplied to an additional clipper discharge device (not shown), wherein the double amplitude vertical pulses are clipped and supplied to the vertical deflection oscillator of the receiver, thus discriminating against the horizontal pulses.

While I have shown embodiments of my pulse discriminator circuit in connection with television receivers, it is apparent that the invention is not limited thereto, but may be applied to any communication system of a pulse type wherein it is desired to discriminate between wanted and unwanted impulses by pulse width discrimination.

Hence, while I have shown particular embodiments of my invention, it will be understood that I do not wish to be limited thereto, since various modifications may be made, and I contemplate by the appended claims to cover any such modifications as fall within the true spirit and scope of my invention.

What I claim as new and desire to secure by Letters Patent of the United States is:

1. In combination, an electron discharge device having an anode, a cathode and a control electrode, a source of composite signal, said composite signal including desired and undesired impulses, a time delay circuit having a pair of input terminals and a pair of output terminals, one of said input terminals and one of said output terminals being connected together and connected through a resistor to said cathode, means for producing a voltage varying with said composite signal across said resistor, the other of said input terminals being connected to said source, and the other of said output terminals being coupled to said control electrode to supply thereto the sum of said composite signal voltage and a time delayed signal voltage, and means for biasing said control electrode to a threshold substantially equal to the peak amplitude of said composite signal in the absence of said undesired impulses.

2. In combination, an electron discharge device having an anode, a cathode and a control electrode, a source of composite signals, said composite signals including desired and undesired impulses, a first solenoid winding having an input terminal and an output terminal, and having said input terminal connected to said source and said output terminal coupled to said control electrode, a second solenoid winding concentric to said first winding and wound in the opposite direction to said first winding, having an input terminal and an output terminal and having said input terminal connected to said cathode and said output terminal connected to the output terminal of said first solenoid winding through a resistor, and means for biasing said control electrode to a threshold substantially equal to the peak amplitude of said composite signals in the absence of said undesired impulses.

3. In a pulse discriminator circuit, a source of composite pulse signals, said signals including recurrent desired pulses, each of substantially constant amplitude and of at least a predetermined time duration, and also including undesired pulses of less than said duration, an electron discharge amplifier having grid and output circuit, a four-pole passive signal-translating network having its input terminals connected across said source and its output terminals connected across said grid circuit, said network including time delay means for delaying all pulses impressed thereon by an amount substantially less than said predetermined duration and for adding the delayed and undelayed pulses at its output, and peak detector means responsive to the peak amplitude of the resultant pulse voltages at said output terminals for biasing said grid to non-conductive condition for all pulse voltages substantially less than said peak amplitude.

ROBERT B. DOME.

REFERENCES CITED

The following references are of record in the file of this patent:

UNITED STATES PATENTS

| Number | Name | Date |
|---|---|---|
| 2,211,942 | White | Aug. 20, 1940 |

FOREIGN PATENTS

| Number | Country | Date |
|---|---|---|
| 528,192 | Great Britain | Oct. 24, 1940 |